June 2, 1964  K. P. MONROE  3,135,727
LIGNITE DERIVATIVE AND PROCESS FOR PREPARING THE SAME
Original Filed May 10, 1957  3 Sheets-Sheet 1

KENNETH P. MONROE
INVENTOR.

BY Browning, Simmons
Byer & Eickenroht
ATTORNEYS

KENNETH P. MONROE
INVENTOR.

ATTORNEYS

KENNETH P. MONROE
INVENTOR.

United States Patent Office 3,135,727
Patented June 2, 1964

3,135,727
LIGNITE DERIVATIVE AND PROCESS FOR
PREPARING THE SAME
Kenneth P. Monroe, Houston, Tex., assignor to Magnet
Cove Barium Corporation, Houston, Tex., a corporation of Arkansas
Original application May 10, 1957, Ser. No. 658,378, now
Patent No. 3,034,982, dated May 15, 1962. Divided
and this application Oct. 31, 1961, Ser. No. 151,590
22 Claims. (Cl. 260—125)

This invention relates to water-soluble or water dispersible lignite derivatives and also to a well fluid in which such lignite derivatives are employed to control the properties, particularly the yield point and viscosity characteristics of the fluid. In another respect, it relates to methods for producing such lignite derivatives. In still another aspect, the invention relates to a method for controlling the yield point of a well fluid such as a mud.

Lignite, an abundant and cheap domestic raw material, previously has been used to control the viscosity of oil well drilling muds. Its usefulness as a "thinner" for muds has been limited because it is rendered much less effective by commonly encountered mud contaminants such as common salt (sodium chloride) and calcium compounds (anhydrite, gypsum, cement and the like). In other words, these mud contaminants will progressively coagulate the lignite so that it can no longer exert its desired protective colloidal action.

Further, lignite is significantly effective as a viscosity control agent only when used in conjunction with caustic or in a highly alkaline mud. One practice has been to mix raw lignite and caustic together at the well site in order not only to solubilize the lignite but also to give the mud the required causticity for the lignite to exert its maximum thinning effect. This requires not only handling of two separate materials but also the handling of large amounts of caustic, which is fraught with danger. Furthermore, control in the field of the caustic-lignite reaction and of the amount of caustic present in the mud to get optimum results are both difficult so that treating results tend to be erratic.

Attempts have been made to pre-react lignite with caustic or soda ash so as not only to improve its usefulness as a mud thinner but also to provide a single material which can be manufactured under controlled conditions at a central site and then shipped to the field for use as a single additive. Such pre-reaction of raw lignite with moderate amounts of water-soluble alkali (up to and including about 25% of the weight of the raw lignite so pre-reacted) has been a common practice, since the resulting product can be readily manufactured as a non-caking, free-flowing powder by conventional drying methods. However, the pre-reacted product does not have the desired effectiveness as a thinning agent in the presence of salt and calcium contamination because it will still be coagulated. To decrease the degree of coagulation, the driller must add not only the pre-reacted lignite but also a large amount of additional caustic (usually a weight about equal to that of the pre-reacted lignite). Thus the driller must still handle two ingredients including relatively large amounts of the troublesome caustic, so that in such cases there is very little advantage in using pre-reacted lignite in place of raw lignite other than the fact that the pre-reacted lignite can be dispersed more easily than the raw lignite. Efforts have been made to pre-react the necessary large amount of caustic with the lignite, but the large amount of caustic makes the complete removal of water from the final product very difficult, and the final product, even when forcibly dried under extreme conditions, is extremely hygroscopic, cakes severely under ordinary conditions of handling and storage, is almost as corrosive to the skin as is pure sodium hydroxide, and is often easily spontaneously combustible. Therefore, since pre-reaction of all the required caustic with the lignite is not commercially feasible, the oil well driller necessarily has to handle caustic at the wellhead even though he uses the pre-reacted lignite.

In accordance with one aspect of this invention, there is provided a new and novel process in which raw lignite is reacted, in an alkaline medium, with a water-soluble sulfite or bisulfite and an aldehyde or ketone to produce a new and novel product, sulfo-alkylated lignite which in turn, can be oxidized or nitritated to produce still another new and novel product, oxidized or nitritated sulfo-alkylated lignite.

It has been found these products can be used as a dispersing agent, particularly as a thinning and yield point controlling agent for drilling muds. The efficiency of the sulfo-alkylated lignite is less than that of the oxidized or nitritated sulfo-alkylated lignite. As will be shown, the sulfo-alkylated lignite and the oxidized form thereof are usually at least equal in dispersing power to conventional quebracho-caustic and lignite-caustic dispersants and, in many mud systems, particularly those containing a hydratable clay such as bentonite, they are superior to these two conventional dispersants and this is particularly true in those systems contaminated with salt and calcium. Through this discovery, there is provided new and novel well fluids and methods of treating the same to control their yield point without substantially adversely affecting their other characteristics such as gel strength and fluid loss.

The new products above referred to can be provided as dry products for commercial use by conventional drying methods, such by drum drying, spray drying, or the like. They are stable, non-caking and free-flowing products when packaged, stored and transported in conventional multi-wall paper bags. They are readily useable by the oil well driller without additional processing, affording the driller for the first time a lignitic additive which in many systems can be used without the addition of caustic therewith and in other systems with only small amounts of added caustic, to yield the desired maximum yield point control of muds in the presence of commonly encountered mud contaminants. The products are non-corrosive to the skin and are not prone toward spontaneous combustion under customary conditions of manufacture, storage and transport.

It is accordingly an object of this invention is provide new lignitic derivative products of the types above-mentioned and to provide a process for making such lignitic products, the process being directed to the upgrading of lignite into a water-soluble form such that it will be an efficient dispersant not requiring large quantities of caustic for its use.

Another object is to provide a process of treating lignite to convert it into an efficient dispersing agent finding particular use in drilling muds, the treatment involving the reaction of lignite with certain reactants in such a manner that its dispersing power is greatly increased without the use of large quantities of caustic so that the resulting lignitic product can be packaged, sold and used as a single product which will not cake during storage and which is not noticeably corrosive to the skin.

Another object is to provide a process wherein sulfo-alkylated lignite is oxidized to further enhance its dispersing powers.

Another object is to provide a drilling mud in which a lignitic derivative of the foregoing types is employed as a dispersant to control the yield point of the mud, particularly when the mud is contaminated with salt or calcium or when it contains highly hydratable clays such as bentonite.

Another object is to provide a method for controlling the yield point characteristics of a mud through the use of a lignitic reaction product of the types above mentioned.

Another object is to provide a process for increasing the hydrophilic properties of lignite to produce new products having various uses in addition to those mentioned above.

Other objects, advantages and features of this invention will be apparent to one skilled in the art upon consideration of the written specification and claims.

The annexed drawings represent plots of the results of certain tests set out in the examples below. In these drawings.

Figure 1:
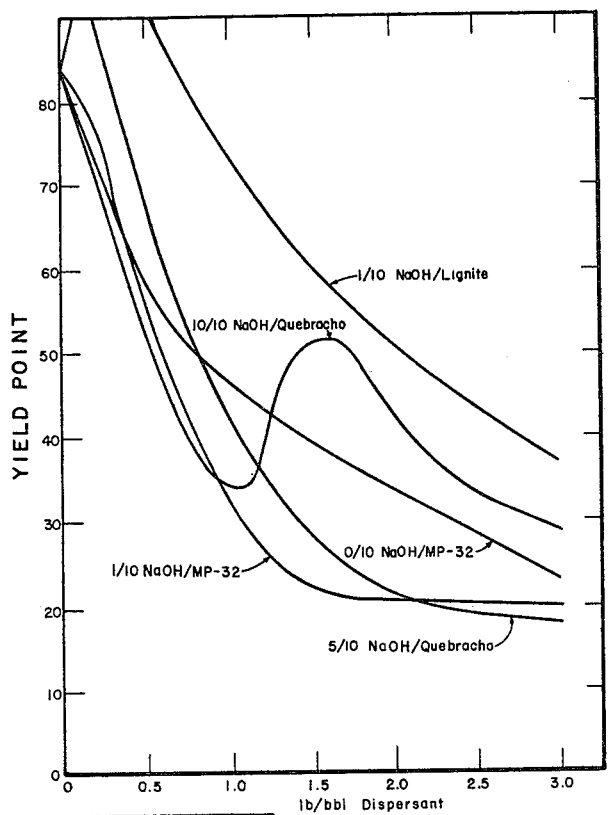
FIG. 1 represents a comparison of the thinning characteristics of a preferred species of this invention and conventional dispersants.

The sulfo-alkylated lignite of this invention can be prepared by admixing lignite, a water-soluble alkali metal hydroxide, a water-soluble sulfite or bisulfite of an alkali metal, and an aldehyde or ketone in reaction medium and then causing inter-action between these ingredients under conditions of time and temperature which cause chemical conversion of a substantial portion of the original lignite to a more hydrophylic product.

It is thought that this product is a sulfo-alkylated lignite, the term "alkylated" being used in its broadest sense to include aliphatic, cycloaliphatic, heterocyclic and aryl groups. If such is true, then the lignite is solubilized by adding thereto a sulfo-alkyl radical

$$-R-SO_3M \qquad (I)$$

wherein R is a methylene radical or a substituted methylene radical derived from a ketone or an aldehyde and M is an alkali metal. Further where a di- or a poly-ketone or -aldehyde is used, that is one containing a plurality of keto or aldo, or both, groups per molecule, the two methylene groups will be linked together by the remainder of the ketone or aldehyde molecule, there being present two —$SO_3M$ groups and the methylene groups being connected to one or more lignite molecules. However, due to the chemical complexity of the lignite molecule and its reactions, it is preferred to describe this type of product as the reaction product of lignite, a sulfite and an aldehyde or ketone in a basic reaction medium. The term "sulfo-alkylated lignite" will be used herein to describe such a product, the "alkylated" part of the term being as above defined.

Lignite is found in many parts of the United States. It is defined as a variety of coal intermediate between peat and bituminous coal, especially one in which the texture of the original wood is distinct. It is also called "brown coal" or "wood coal." its chemical characteristics and composition have been widely described in the literature, such as in the Journal of the American Chemical Society, Vol. 69 (1947), and in the U.S. Bureau of Mines Information Circular 7691, parts 1 and 2, published July, 1954. Lignite is to be sharply distinguished from lignin and quebracho, neither of which will yield a dispersant of improved properties when substituted for lignite in the process of this invention. This is understandable when it is understood that these three substances are of quite different chemical nature. Thus, lignin consists only of carbon, hydrogen and oxygen while lignite contains also nitrogen and sulfur. Lignin contains no fatty components whereas lignite does. Recent research has yielded conclusive evidence that lignite is derived primarily from seeds (cones) of the original gymnosperms rather than from the boles or branches or needles, where as lignin is derived primarily from the boles or branches or needles and not from seeds. Further, as will be shown hereafter, the sulfo-alkylation of lignin and quebracho, whether or not followed by oxidation, does not materially improve the dispersing properties of these materials; in fact, it will sometimes cause these properties to deteriorate.

In general, the term "lignite" will be used herein to mean not only lignite per se but also all naturally occurring carboniferous minerals containing 10 percent or more, preferably 30 to 50 percent, of humic acid.

The alkali metal hydroxide employed in the sulfo-alkylation reaction can be sodium, lithium or potassium hydroxide. The amounts to be used can be varied over a considerable range. Its principal function is thought to be to impart sufficient initial solubility to the raw lignite that it can react with the sulfite and aldehyde or ketone reactants. Thus it has been found that in order to achieve a practical reaction rate for the sulfo-alkylation reaction, the pH of the reaction medium should be at least 10. In any event, enough hydroxide should be used so that the initial pH of the reaction medium is at least 7 and preferably 10 to 13. Hence, the reaction can be described as being conducted in a basic reaction medium and it is immaterial whether the hydroxide is separately added to the medium, in admixture with other materials or is already present therein. When a bisulfite (e.g., sodium hydrogen sulfite) is used, sufficient hydroxide should be present to convert this to the sulfite form. It is preferred that the amount of alkali metal hydroxide used be within the range of 10 to 100 parts by weight per 100 parts by weight of the raw lignite. The alkali metal hydroxide can be pre-reacted with the lignite before the sulfite and aldehyde or ketone are brought into the reaction, or it can be added with the latter. In this connection, commercial alkali lignite can be used as a starting material instead of raw lignite. In some cases, it is desired that the final lignite product have a certain causticity. Thus, in using the instant lignitic derivatives as mud thinners, it has been found that optimum results are frequently obtained when a certain amount of caustic is present. For example, in treating simple aqueous dispersions of clays, optimum results are achieved when about 10 percent by weight of additional caustic, based on the weight of the sulfo-alkylated lignite product, is added. In lime base muds, this figure is about 20 percent of additional caustic. The caustic to be used can be selected from the aforesaid range of 10 to 100 parts per 100 parts of raw lignite to give the desired degree of causticity to the final dry product so that when the dry product is mixed with the mud or other well fluid, the latter has the desired causticity. Alternatively, an amount of caustic in the lower part of the range, and less than that desired in the final dry product, can be used during the sulfo-alkylation reaction. Then the additional caustic required to yield the final desired caustic concentration can be added to the sulfo-alkylated product, the only requirement being that the caustic be intimately mixed with the lignite reaction product. The final product can be dried by conventional methods. The dry product is still free flowing, non-hygroscopic and substantially non-corrosive to the skin. In effect then, the lignite product "masks" the caustic, rendering it incapable of doing damage when the dispersant-caustic mixture is used in its intended manner.

The above applies not only to the use of the sulfo-alkylated product of this invention but also to the use of the oxidized derivatives thereof as disclosed herein.

The alkali metal sulfite can be sodium, potassium or lithium sulfite or bisulfite. In general, sulfurous acid and its water-soluble salts also can be used. In this connection, the addition of a bisulfite or sulfurous acid to the basic reaction medium will convert the bisulfite or acid to a sulfite. Hence, the term "sulfite" will be used herein to include the bisulfite as well as other compounds which, when added to the basic reaction medium, will in effect react as an alkali metal sulfite.

The amount of sulfite to be used will be dependent upon the percentage of lignite desired to be converted to the sulfo-alkylated form. About 25 parts of sodium sulfite are required to secure approximately total conversion of 100 parts of raw lignite and is therefore the stoichiometric equivalent for the sulfo-alkylation reaction. As will be demonstrated in the examples, use of excess sulfite over that stoichiometrically required to convert the lignite is not harmful to the reaction but is wasteful of sulfite. Generally, it is desired that at least 6 parts of sulfite be used per 100 parts of lignite. The numerical range can be stated to be from 6 to 50 parts of sulfite per 100 parts of lignite, it being understood that at the lower limit, the lignite will not be completely converted and at the upper end of the range, unreacted sulfite will remain in the reaction product. For optimum results, the stoichiometric equivalent of sulfite should be used.

The aldehyde or ketone employed in the reaction can be any type of aldehyde or ketone having at least one aldo (HCO—) or methyl keto (CH$_3$CO—) group per molecule so that the aldehyde or ketone has a carbon atom capable of becoming a methylene or a substituted methylene group in the sulfo-alkylation reaction. Both water-soluble and water-insoluble ones can be used. In general, then, the aldehyde or ketone reactant can be represented by the formula (RCO)$_n$R$_1$ where R is chosen to be hydrogen for the aldehydes and a methyl group for the ketones, $n$ is a whole number of 1 to 3 inclusive and R$_1$, being nonfunctional in the reaction, can be any aliphatic, alicyclic, aryl or heterocyclic group. Thus, within this definition, aliphatic, alicyclic, aryl and heterocyclic aldehydes and ketones, and mixtures thereof, all may be used. For example, alkyl, alkenyl, alkynyl mono- and poly-aldehydes and mono- and poly-methyl ketones can be used and exemplary of these are methanal (including the para form which is preferred), ethanal, propanal, butanal, hexanal, decanal, dodecanal, tetradecanal, hexadecanal, eicosanal, dotricontanal, acrolein, propenal, butenal, heptenal, decenal, hexadecenal, eicosenal, dotricontenal, propargylaldehyde, butynal, decynal; the corresponding ketones with the carbonyl group in the alpha position (except of course that there is no ketone corresponding to methanal, etc.) such as 2-propanone (acetone), 2-butanone, 2-eicosanone, etc.; the corresponding di- and tri-aldehydes and the di- and tri-ketones (with at least one carbonyl group in the alpha position—it is not necessary that all carbonyl groups be so positioned), such as glyoxal, glutaraldehyde, adipialdehyde, arachicaldehyde, 2,4-pentanedione, 2,4- and 2,5-hexanedione, 2,15-hexadecanone, 2,5-hexenedione, etc. Representative of the alicyclic aldehydes and ketones is cyclohexanal, cyclobutanal, cyclooctanal, cyclononal, methyl cyclobutyl ketone, methyl cyclohexyl ketone, methyl cycloheptyl ketone, methyl cyclononyl ketone, etc. Among the aryl aldehydes can be mentioned benzaldehyde, salicylaldehyde, vanillin, cumic aldehyde, cinnamic aldehyde, etc. Furfural can be named as representative of the heterocyclic aldehydes. Among the aryl ketones may be mentioned acetophenone, benzalacetone, etc.

It is not believed necessary to further burden the application by listing specific ones of operable aldehydes and ketones because such can be readily discerned once it is realized that the reaction of this invention is operable with any aldehyde or ketone having one or more aldo or methyl keto, or both, groups per molecule. Nevertheless, it is to be realized that the sulfo-alkylated products will vary one from the other in their properties depending somewhat upon the nature of the aldehyde or ketone used in the reaction. For example, it has been found most desirable to use formaldehyde or acetaldehyde for producing additives to be used in well fluids because the other aliphatic aldehydes seem to produce products which cause foaming of the well fluid. However, even with such foaming products, well-known defoaming agents could be added to the mud to control the foaming. The tendency to foam has not been noted with furfural or with the ketones or with the aryl aldehydes. For preparing a dispersant for use in wells, it is greatly preferred to use formaldehyde not only because of its cheapness and availability but because it yields a product having somewhat superior properties as a yield control or thinning agent for muds.

The amount of aldehyde or ketone, like the sulfite, is preferably the stoichiometric equivalent required to completely react the lignite. It has been found that approximately twelve to twelve and one-half parts of formaldehyde are required to substantially 100% convert the lignite to the sulfo-methylated form. Stated as a numerical range, the formaldehyde can be used in the amount of 3 to 25 parts per 100 parts of lignite.

As for the ketones and the aldehydes other than formaldehyde, many of them can be used in amounts within the above-specified range to obtain operable results. However, it is preferred to use amounts which are stoichiometric equivalents for substantially complete reaction of the lignite. Accordingly, the weight of the other aldehyde or ketone used should preferably be that which is stoichiometrically equivalent to the lignite or to the formaldehyde as above disclosed. For convenience in defining a range, the amount of aldehyde or ketone of any type to be used in this reaction will be specified herein as "an amount stoichiometrically equivalent to an amount of formaldehyde within the range of 3 to 25 parts of formaldehyde per 100 parts of lignite".

It has been found that excess of aldehyde or ketone over the stoichiometric equivalent does not harm the reaction, but results in waste of material. Use of less than stoichiometric amounts results in less than 100% conversion of lignite.

It will of course be seen from the above that mixtures of the various aldehydes and ketones can be used to obtain various results.

The reaction medium can be any fluid which is substantially inert insofar as the reaction is concerned and preferably is water.

The sulfo-alkylation reaction proceeds best at elevated temperatures. It can be carried out in simple refluxing equipment at temperatures within the range of 175° to 212° F. However, the degree of conversion of the lignite within this temperature range is not complete within commercially feasible time limits such as 3 to 7 hours. It is accordingly preferred that the sulfo-alkylation reaction be carried out in pressure vessels at temperatures within the range of 275° to 375° F. At these temperatures, the time of reaction for substantially complete conversion of the lignite will usually fall within the range of 1 to 6 hours. Stated in another manner, the lower limit of the temperature range is rather flexible but should be high enough to give the desired degree of conversion within the desired time. Of course, lengthening the reaction time permits lowering of the reaction temperature to give the same conversion. On the other hand, the upper limit of the temperature range is dictated by the maximum temperature which the lignite will tolerate without serious disruption of its large molecules and consequent deterioration of the protective colloidal action of the sulfo-alkylate products. Approximately 360° to 375° F. represents a workable maximum which will not cause substantial degradation of the lignite in aqueous solution.

In a preferred mode of procedure, the lignite, base, sulfite and aldehyde or ketone are refluxed together in an aqueous suspending medium at a temperature of 190° to 212° F. This refluxing is continued for a period of 3 to 6 hours. Then the mixture is autoclaved or otherwise subjected to temperatures in the higher range mentioned above. Of course, if desired, the initial reactants can be placed directly in the autoclave and subjected to the elevated temperature from the beginning. However, in such case, closer control is required and the reaction may not proceed so smoothly as when the mixture is refluxed before being autoclaved.

The reaction product can be used in liquid form as it comes from the reaction, but preferably it is dried first. Such drying can be accomplished by conventional procedures such as by drum drying or spray drying at a temperature in the range of 215° to 375° F. The dried solids can then be bagged and shipped to the field for use as described above. The dried product, when bagged in conventional multi-wall bags, remains dry and free-flowing over long periods of storage and will not cake. It is not noticeably corrosive to the skin and can thus be handled with safety. It can be added to the mud as a single thinning or dispersing additive by simply pouring it into a mud stream or otherwise admixing it therewith. Since it exhibits a marked solubility in water, little or no difficulty will be encountered in getting it into solution where it can be active to exert its protective colloidal properties.

As indicated above, it has been found possible to increase the hydrophilic properties of the sulfo-alkylated product and to increase its resistance to calcium and salt, as well as to improve its dispersing powers in a mud, by oxidizing or nitritating the same. As used herein, the term "oxidation" shall be used in its broadest sense to include reaction with oxygen, chlorine, nitrites, hydrogen peroxide, hypochlorites, etc. The increased dispersing efficiency of the oxidized product is particularly notable in drilling muds containing hydratable clays, such as bentonite, and other types of muds, such as lime base muds, which exhibit very high yield points prior to adding a dispersant thereto.

The starting material for the oxidation reaction can be any of the sulfo-alkylated lignites disclosed above, but it should be noted that the increase in efficiency brought about by the oxidation reaction will vary in degree with the different sulfo-alkylated lignites. For example, a maximum increase in efficiency seems to be secured with sulfo-alklated lignite prepared from formaldehyde or furfural.

There is a wide variety of oxidizing agents which can be used. Thus, any oxidizing agent which has an effective oxidation potential in a reaction medium, such as water, over the alkaline range of pH 7 or above is operable. Oxygen, preferably ordinary air (for economic reasons), is the preferred oxidizing agent. Others include chlorine gas, alkali metal nitrites, the alkali metal hypochlorites, hydrogen peroxide and others. Ozone can also be used and it is particularly efficient because of its high oxidation potential and oxidative catalytic power.

While the oxidation reaction proceeds in the absence of a catalyst, it is preferred to use a suitable catalyst to speed up the reaction. Various ones of well-known catalysts can be used. It should be an oxygen-containing compound of a polyvalent metallic element known to have more than one valence toward oxygen. For example, manganese may have valences of 2, 4, 6 or 7, while vanadium may have valences of 2, 3, 4 or 5. It is desirable, but not absolutely essential, that the oxygen-containing compound of the polyvalent metallic element be capable of becoming the negative component of an alkali metal salt having at least a moderate solubility in water over the alkaline pH range. For example, manganese dioxide is almost insoluble in neutral watery suspension but forms manganites, manganates and permanganates which are reasonably soluble in water. Likewise, vanadium may enter into the negative component as ammonium or alkali metal vanadates or as the alkali metal salts of vanadous acid and of the other acids with vanadium in still other valence states. In addition to the oxygen-containing compounds of vanadium and manganese, there may be mentioned the oxygen-containing compounds of copper, chromium, molybdenum, selenium, tellurium, tungsten, cerium, arsenic, antimony, iron, cobalt, and nickel. Catalysts which are preferred, primarily for economic reasons, are cobalt acetate and also manganese dioxide promoted with ammonium meta-vanadate. The amount of catalyst to be used will be determined primarily by economic considerations, that is, the cost of the catalyst per se, the amount required to be used to obtain the desired reaction in a minimum of time, etc. The amount used is not critical as long as enough is present to speed up the reaction so that it will be completed in the desired time. In the case of the manganese dioxide-ammonium meta-vanadate combination, the amount of manganese dioxide can be within the range of between $\frac{1}{10}$ to 5% of the weight of the sulfo-alkylated lignite being oxidized and the amount of ammonium meta-vanadate equal to approximately $\frac{1}{20}$ to $\frac{1}{4}$ the weight of the manganese dioxide. An amount of cobalt within the range of that given above for the manganese dioxide can be used. The same range applies to other catalysts. However, it must be emphasized (1) that the oxidation reaction can proceed without a catalyst, (2) that the amount of catalyst used is not important except excessive amounts are expensive and insufficient amounts may not cause the reaction to be completed in a desired time, and (3) the type of oxidation catalyst may be chosen from those known to the prior art.

The oxidation reaction can be carried out in various manners. The sulfo-alkylated lignite or starting material should be in admixture with a suitable reaction medium, such as water, the mixture having a pH on the alkaline side. Catalyst, if used, can then be added to this mixture followed by the addition of the oxidizing agent. When air is used, it is preferably bubbled through the reaction mixture so as to assure that reactive oxygen is dissolved in the reaction medium. Chlorine can be used in the same way, but it should be noted that chlorine is very much more reactive than air so that it should be added to the reaction mixture at a lesser rate. Other oxidizing agents, such as the nitrites, hydrogen peroxide and the like can be added in the same manner or the total required amount added at the initiation of the reaction.

The pressure at which the oxidation reaction is conducted can vary over wide limits although usually atmospheric pressure will be preferred.

The temperature at which the oxidation reaction is conducted can also vary considerably, but should be below the temperature which the sulfo-alkylated lignite will tolerate without serious disruption of its molecule with a consequent deterioration of its protective colloidal properties. Approximately 360° to 375° F. represents a workable maximum. However from a practical standpoint, a temperature within the range of 40° to 212° F., preferably 120° to 160° F. can be used. Where the reaction is carried out at superatmospheric pressure, the range can extend as high as 350° F. Thus the broad range can be stated as 40° to 350° F.

The reaction time and temperature are adjusted to each other in manners well-known to those skilled in the art so that the oxidation reaction will proceed to a point such that the oxidized product has a desired increase in its beneficial properties. In other words, the sulfo-alkylated product is oxidized to an extent such as will increase its hydrophilic properties. One way of easily determining the optimum time and temperature conditions is to merely sample the reaction mixture after various time and temperature reaction cycles and then determine the efficiency of the samples by routine tests, such as by using mud samples.

It has been noted that during the oxidation reaction, the pH of the reaction mixture will decrease and for air oxidation, a drop of about 1 pH unit will indicate the oxidation reaction has proceeded far enough. Thus, the pH will usually drop from about 10.5 or 11 to about 9.5 during air oxidation and to even lower values (e.g. 8) during chlorination. Hence, the oxidation should proceed until the pH of the sulfo-alkylated lignite solution has dropped at least 0.5 unit. Another way of defining the extent of operable oxidation is to state that the sulfo-alkylated lignite is oxidized until it increases at least 3, preferably from 3 to 25, percent in weight. Generally an oxidation time of from 0.5 to 10 hours will suffice and the exact value chosen from this range will depend on the oxidation temperature, catalyst, oxidizing agent and its concentration, extent of agitation and other factors.

To further demonstrate the invention, the following examples are set forth:

EXAMPLE I

A sulfomethylated lignite sample was prepared by mixing together 30 parts of water, 8 parts of lignite, 2 parts each of sodium hydroxide and sodium sulfite, and 1 part of para-formaldehyde. The mixture was refluxed at 203° to 212° F. for approximately 3 hours and then autoclaved for about 5 hours at 296° to 314° F. The resulting product was drum dried and denoted as MP-32. To evaluate MP-32 as a simple dispersing agent for drilling muds, a 7½ weight percent dispersion of bentonite in fresh water was made up. Increasing portions of MP-32 were added to the mud and its yield point determined. The results are shown in FIG. 1.

In order to compare the effectiveness of MP-32 with other dispersants, other samples of the bentonite dispersion were treated with various amounts of caustic-dispersant solutions as indicated in FIG. 1. In this figure, the weight ratio of caustic to dispersant for each curve is followed by the identification of the caustic-dispersant mixture used.

From FIG. 1, it will be sen that MP-32 is superior to the alkali lignite and is at least comparable to caustic-quebracho in its effectiveness.

EXAMPLE II

To compare the effectiveness of sulfo-methylated lignite with alkali lignite in lime base muds, the following dispersants were prepared:

*MP-13.*—200 parts of lignite were refluxed with 27.5 parts of sodium hydroxide for about 5 hours. 50 parts of sodium sulfite followed by 25 parts of paraformaldehyde were then added. The mixture was refluxed at 203–212° F. for 5 hours.

*MP-23.*—The same procedure was followed as for MP-13 except that 50 parts of sodium hydroxide were used.

*MP-17.*—200 parts of lignite were refluxed with 27.5 parts of sodium hydroxide for 5 hours at 203–212° F.

Figure 2:
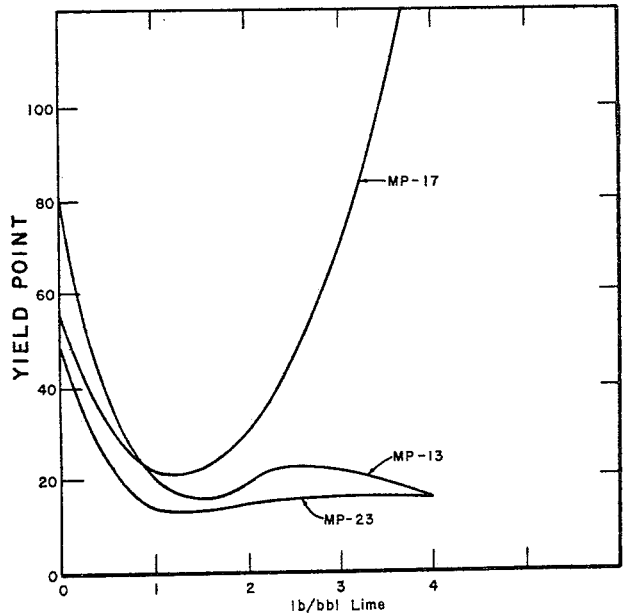
FIG. 2 represents a comparison in a lime-contaminated mud of the thinning characteristics of sulfo-alkylated lignite and conventional alkali-lignite.

Three pounds per barrel of the various dispersants (calculated on a water-free basis) and three pounds per barrel of caustic were added to samples of a 7½ weight percent suspension of bentonite in fresh water. Increasing increments of lime were then added to the samples and their yield points determined. The results are shown in FIG. 2.

As will be seen from this figure, the sulfo-methylated lignite is markedly superior to conventional alkali lignite. Also, increasing the amount of sodium hydroxide in the sulfo-methylating reaction resulted in a somewhat superior product.

EXAMPLE III

Figure 3:
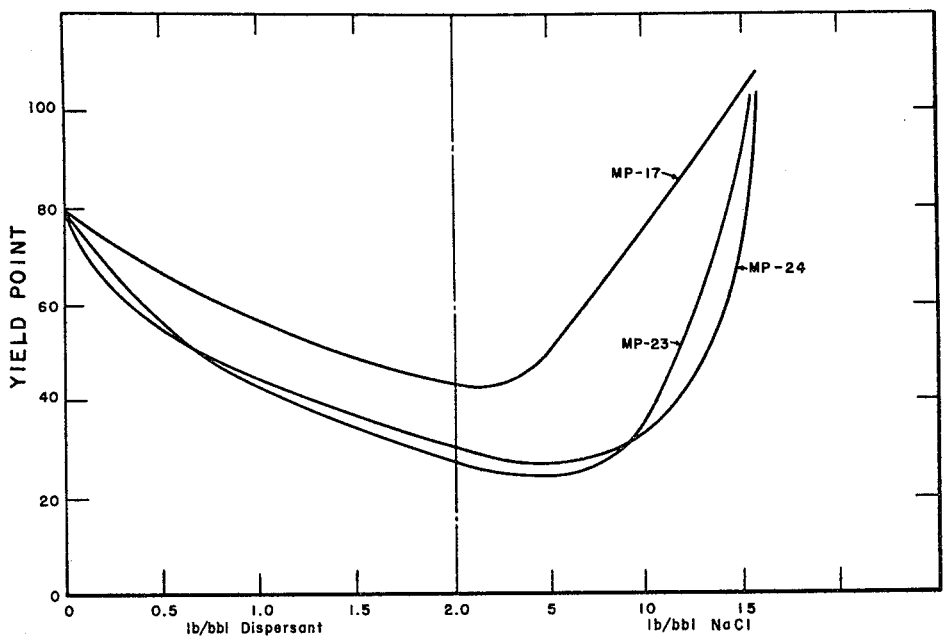
FIG. 3 is another comparison in a salt-contaminated mud.

The MP-17 and MP-23 dispersants of Example II, as well as MP-24 (prepared the same as MP-23 except the autoclaving temperature was 360–370° F.), were each added in increments to samples of a 7½ weight percent bentonite suspension. The yield points were determined after each addition. When 2 lb./bbl. of each dispersant had been added to its sample, salt (sodium chloride) was then added in increments and the yield point determined after each addition. The results are shown in FIG. 3.

It will thus be seen that the sulfo-methylated lignite not only is superior to alkali lignite in lime base or calcium-contaminated muds but also in salt-contaminated muds.

EXAMPLE IV

To show that each of the alkali metal salts of sulfo-methylated lignite are operable to give the advantages of this invention, MP-40 and MP-41 were prepared. The procedure of preparation was the same as for MP-23 recited above except that equivalent amounts of lithium hydroxide and lithium sulfite were substituted for the corresponding sodium compounds of MP-23 in preparing MP-40. Similarly, potassium compounds were substituted in preparing MP-41.

Figure 4:
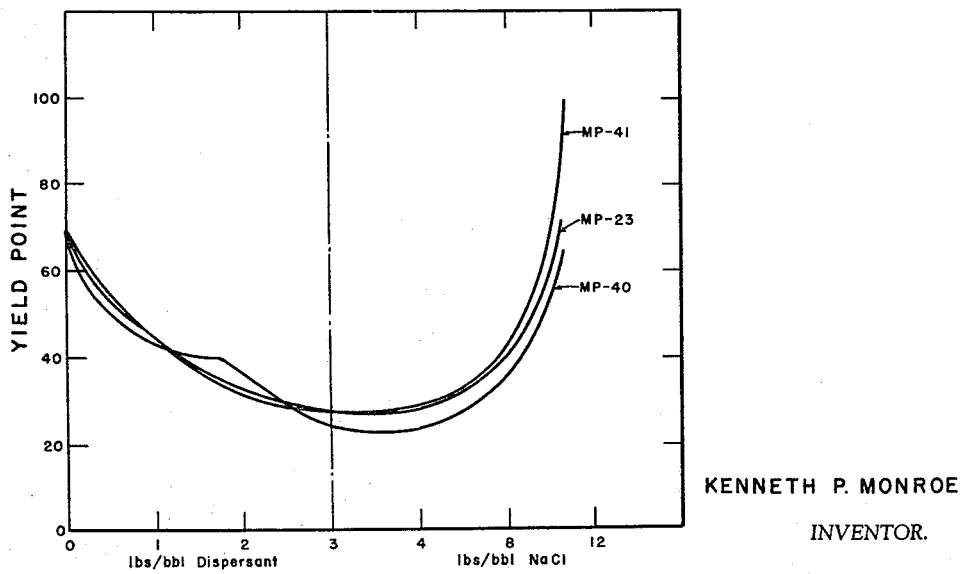
FIG. 4 illustrates the viscosity control characteristics of various alkali metal sulfo-methylated lignites.

Various amounts of MP-23, MP-40 and MP-41 were added to samples of a 7½ weight percent bentonite suspension and the yield points determined. Sodium chloride was added in increments to the bentonite suspension samples which contained 3 lb./bbl. of the respective dispersants. The results are plotted in FIG. 4.

It will be seen that lithium, sodium and potassium compounds are interchangeable in preparing the dispersant of this invention but the sodium compounds will usually be preferred because of their relative cheapness.

EXAMPLE V

Figure 5:
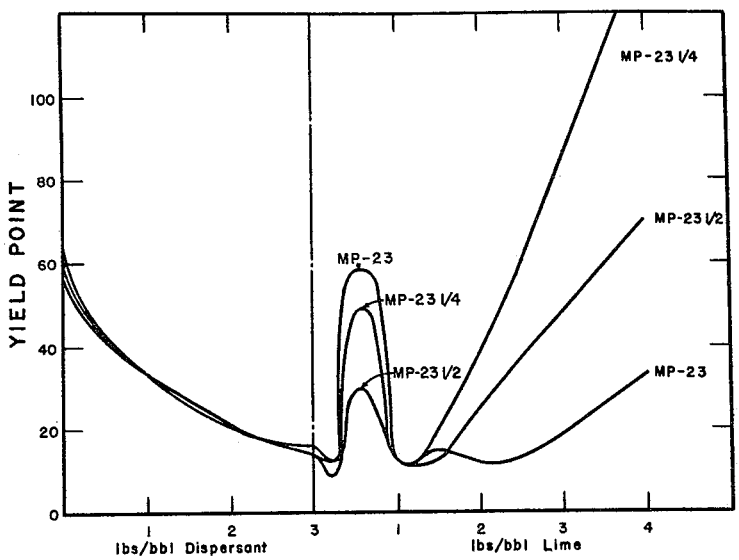
FIG. 5 illustrates the variation of effectiveness of one dispersant of this invention in a lime mud with varying amounts of sulfo-alkylation.

The effect of varying the amount of sulfite and aldehyde used in the sulfo-methylating reaction is shown in FIG. 5. The MP-23 is the same as that used in Example II. The MP-23½ and MP-23¼ were prepared in the same manner as the MP-23 except that approximately ½ and ¼ as much sodium sulfite and paraformaldehyde were used, respectively. Again, a 7½ weight percent bentonite suspension was used. After 3 lb./bbl. of dispersant had been added to the respective mud samples, lime was added in increments without the addition of additional caustic; hence, the "hump" at low lime concentrations. Yield points were determined after each addition to the mud.

While MP-23 gave the best results in the lime muds at higher concentrations of lime, it will be seen that all three dispersants are about equally effective in the absence of lime.

EXAMPLE VI

Figure 6:
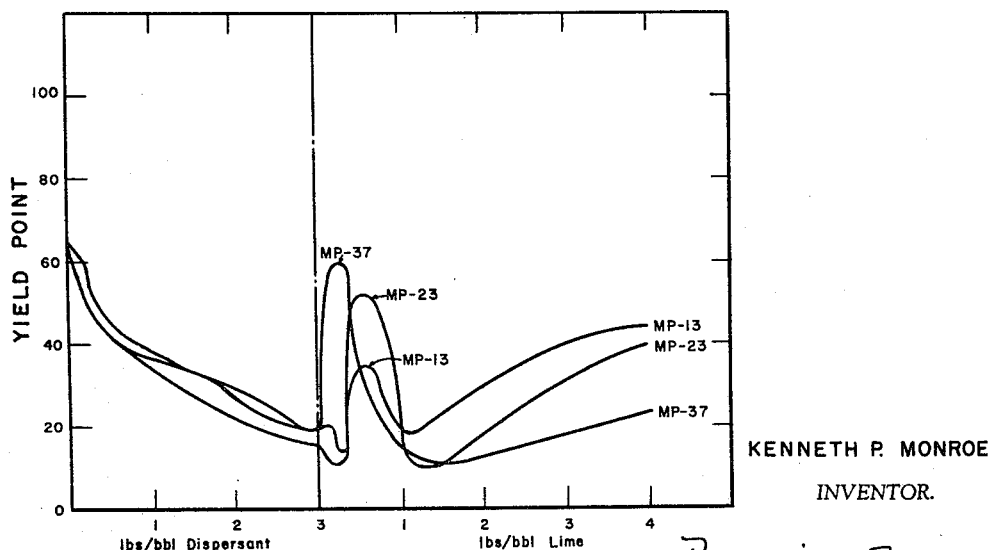
FIG. 6 represents the difference in results which are obtained in a lime mud when varying amounts of sodium hydroxide are used in preparing the sulfo-alkylated lignite of this invention.

FIG. 6 shows the effect of varying the amount of sodium hydroxide used in the sulfo-methylating reaction. The MP-23 and MP-13 were the same as in Example II while the MP-37 was prepared in the same manner except 100 parts of sodium hydroxide were used. The mud samples were 7½ weight percent bentonite suspensions. No additional caustic was added with the lime. The testing procedure was the same as in Example V.

From FIG. 6, it can be seen that generally the effectiveness of the dispersant in lime muds increases with the increasing amount of sodium hydroxide used in its synthesis. However, all of the dispersants are usable, with perhaps slightly more of the MP-13 and MP-23 being required to give the same results as MP-37 at the higher lime concentrations. The cost of the increased amounts of MP-13 and MP-23 may be partially or wholly offset by the extra cost of the additional amount of sodium hydroxide used in preparing the MP-37.

EXAMPLE VII

To determine the effect of sulfo-methylating quebracho, 200 parts of quebracho extract (dry, 70% tannin), 50 parts of sodium hydroxide, 50 grams sodium sulfite and 25 grams of paraformaldehyde and 1675 parts of water were stirred together and refluxed for 5 hours at 203–212° F. This was followed by autoclaving for 5 hours at 296° to 314° F. The resulting product (MP-50) was tested in various muds as shown in Table I. MP-32, prepared as in Example I, and caustic-quebracho were also tested for comparative purposes.

*Table I*

Dispersant

Base treating stock mud: Yield
- 2 lb./bbl. MP-50 _____ 18
- 2 lb./bbl. MP-32 _____ 9
- 2 lb./bbl. quebracho; 1 lb./bbl. caustic _____ 12

7½ weight percent bentonite suspension:
- 2 lb./bbl. MP-50 _____ 17
- 2 lb./bbl. MP-32 _____ 12
- 2 lb./bbl. quebracho; 1 lb./bbl. caustic _____ 13

From the foregoing it can be seen that quebracho which has been treated in the same manner as lignite with sulfite and aldehyde is not rendered equivalent thereto. In fact, it is inferior to both sulfo-methylated lignite and to conventional caustic-quebracho as a dispersant.

EXAMPLE VIII

To demonstrate the range of concentrations of sodium hydroxide, sodium sulfite and paraformaldehyde which can be reacted with lignite to achieve the benefits of this invention, the tests reported in Table II were run. In each test, the amounts of the indicated reactants were stirred into water and the mixture refluxed for five hours at 203–212° F. In some cases, the mixture was autoclaved for five additional hours at the temperature indicated. The final product was then analyzed and the percentage of sulfite and aldehyde reacted was calculated.

*Table II*

| Product dispersant designation | Reactants, parts | | | | Autoclaving, °F. | Percent sodium sulfite reacted* | Percent paraformaldehyde reacted* |
| --- | --- | --- | --- | --- | --- | --- | --- |
| | Lignite | NaOH | Sodium sulfite | Paraformaldehyde | | | |
| MP-1 | 200 | 50 | 100 | 50 | None | 17 | 8.5 |
| MP-1a | 200 | 50 | 100 | 50 | 296–314 | 24.5 | 12.3 |
| MP-13a | 200 | 27.5 | 50 | 25 | None | 14.8 | 7.4 |
| MP-13 | 200 | 27.5 | 50 | 25 | 296–314 | 23.3 | 11.7 |
| MP-20 | 200 | 27.5 | 50 | 25 | 360–370 | 24.3 | 12.2 |
| MP-23 | 200 | 50 | 50 | 25 | 296–314 | 24.0 | 12.0 |
| MP-23½ | 200 | 50 | 25 | 13 | 296–314 | 12.2 | 6.1 |
| MP-23¼ | 200 | 50 | 13 | 7 | 296–314 | 6.1 | 3.1 |

*Based upon weight of raw lignite (containing 4 to 5 percent of water).

From Table II, it can be seen that autoclaving (reaction at temperatures substantially above 212° F. but below the decomposition temperature of lignite) increases the degree of sulfo-methylation, compared with refluxing only, about 50% irrespective of whether the sulfite-aldehyde is present in excess or in stoichiometric equivalents to the lignite. Also, regardless of whether or not the sulfite-aldehyde concentrations are doubled (MP-1 and -1a), the maximum amount of sulfite reacted is 15 to 17 weight percent of the weight of the lignite with refluxing only and is about 24% by refluxing and autoclaving. Further, the maximum amount of sodium sulfite and paraformaldehyde which can be reacted with the North Dakota lignite used at temperatures below the decomposition temperature of such lignite is about 24–25% and 12–12.5% respectively.

EXAMPLE IX 400 parts of lignite, 100 parts each of sodium hydroxide and sodium sulfite and 50 parts of paraformaldehyde were combined with 1510 ml. of water and refluxed for 5 hours at 203–212° F. Thereafter, the mixture was autoclaved for 5 hours at 296–314° F. Then the reaction mixture was dried and weighed. Each 100 ml. of mixture yielded 26.2 grams of dry solids. This is equivalent to a yield of dry solids of 87.3 weight percent of the dry reactant starting materials. Calculations based on the theoretical reaction and taking into account the water formed by the reaction indicated a theoretical yield of dry solids of 88.5 weight percent of the original dry solid reactants. When the lignite is considered to contain about 4.5% water and this is allowed for, the actual yield is almost 100% of theoretical.

Based on these calculations, each 100 parts of dry MP-32 dispersant requires, as starting reactants, about:

- 70.6 parts lignite
- 17.7 parts sodium hydroxide
- 17.7 parts sodium sulfite
- 8.8 parts paraformaldehyde

EXAMPLE X

A 10% aqueous solution of MP-32 (prepared as per Example I) was mixed with 1% (based upon the dry solid MP-32) of ground manganese dioxide and 0.10% ammonium meta-vanadate (based upon weight of manganese dioxide). The resulting mixture was placed in a Cavitator and air bubbled therethrough at atmospheric pressure. The oxidation caused a mild temperature peak (87° F. with an eventual drop nearly back to room temperature). The total oxidation time was 12 hours. The air-oxidized solution was oven-dried at 230° F., ground, bottled and labelled MP-69. The dry product weighed approximately 12% more than the weight of the original dry MP-32. The pH of the solution dropped approximately 1 pH unit during the oxidation.

The MP-69 was then tested in base stock and in a lime base mud. The results are reported in Table III.

*Table III*

BASE STOCK

| Thinner | App. visc. | Yield | 10 min. gels |
| --- | --- | --- | --- |
| 2 lb./bbl. MP-69 | 22.5 | 11 | 35 |
| 2 lb./bbl. quebracho+1 lb./bbl. NaOH | 28 | 12 | 33 |

LIME BASE MUD (6 lb. lime per bbl)

| | | | |
| --- | --- | --- | --- |
| 5 lb./bbl. MP-69+1 lb./bbl. NaOH | 29 | 8 | 35 |
| 3 lb./bbl. quebracho+3 lb./bbl. NaOH | 28.5 | 9 | 134 |

From Table III, it would seem that MP-69 is at least as good as quebracho and caustic for thinning simple mud systems and is actually superior in lime base muds because of the much lower 10 minute gel.

EXAMPLE XI

A series of different sulfo-alkylated lignites were prepared by mixing 25 parts of each of sodium hydroxide and sodium sulfite with 100 parts of lignite in approximately 330 parts of water. The mixtures was then stirred at a temperature slightly below the boiling point thereof and then various amounts of the aldehydes and ketones indicated in Table IV were added. The reaction was allowed to continue for approximately 5 hours at approximately 200–212° F. and atmospheric pressure. Thereafter, the mixture was autoclaved for 5 hours at a temperature in the range of 275–315° F. Where the reaction product was not to be oxidized, the mixture was then removed from the autoclave and dried. Where the mixture was oxidized, this was accomplished by bubbling air therethrough for approximately 7 hours at about 120° F. A catalyst comprising one part of manganese dioxide and .2 part of ammonium meta-vanadate was used.

In each reaction, there was a significant decrease in pH of the mixture during both the sulfo-alkylation reaction and the subsequent oxidation. In most cases the pH dropped from the order of 12 for the initial mixture to 9 or 10 for the final oxidized mixture. Each reaction yielded at least 90% of theoretical and there was increase in weight of from 5 to about 15% (based upon the sulfo-alkylated product per se) during the oxidation reaction. Each product upon drying remained dry and free-flowing and was not corrosive to the skin.

The various reaction products were tested in drilling muds. For the column labelled WBM (water base mud) the mud comprised about 15 lb./bbl. of Yellowstone bentonite, 31 lb./bbl. of a low yielding adsorptive clay (X-act) and 73 lb./bbl. of barite, thus giving a mud having 25.4% solids by weight and a weight of 10.3 p.p.g. The lime base muds (LBM) were made by adding 6 lb./bbl. of lime to the water base muds. For the tests to determine the yield point of the water base mud, 2 lb./bbl. of the reaction product (thinner) were added. For the tests for the lime base mud, 5 lb./bbl. of the thinner plus 1 lb./bbl. of caustic were added.

*Table IV*

| Reactant—pts./wgt. | Oxidized | Yield point | |
|---|---|---|---|
| | | WBM | LBM |
| Glutaraldehyde—26 | No | 8 | 24 |
| Acrylic aldehyde—24 | No | 9 | |
| Acetone—25 | Air | 9 | 21 |
| Methyl ethyl ketone—31 | Air | 11 | 14 |
| Hexane dione—42 | Air | 16 | 5 |
| Methyl isobutyl ketone—27 | Air | 14 | 41 |
| Acetophenone—41 | Air | 14 | |
| $C_7$—12 | Air | 18 | |
| $C_{10}$—26 | Air | 19 | |
| $C_{14}$—35 | Air | 20 | |
| $C_{18}$—45 | Air | 14 | |
| Propionaldehyde—24 | No | 23 | 16 |
| Acetaldehyde—10 | Yes | 12 | 18 |
| Butyraldehyde—15 | Yes | 11 | |
| Butyraldehyde—30 | No | | 23 |
| Butyraldehyde—30 | Yes | | 14 |
| Furfural—40 | Yes | 11 | 19 |
| Benzaldehyde—21 | Yes | 12 | 15 |
| Benzaldehyde—21 | No | 17 | 36 |
| Salicylaldehyde—26 | Yes | 13 | 12 |
| Salicylaldehyde—26 | No | 17 | 14 |

The above test clearly demonstrate the thinning action of the various reaction products, particularly when it is considered that the water base mud, in the absence of a thinner, had a yield point of approximately 70 or more. The yield point of the lime base mud, without thinner, was even higher because the mud was too thick to measure.

In the foregoing table, the reactants labelled $C_7$, $C_{10}$, $C_{14}$ and $C_{18}$ are long chain aliphatic monoaldehydes having 7 carbon atoms per molecule, 10 carbon atoms per molecule, etc.

EXAMPLE XII

Sulfo-methylated lignite (MP-32) was oxidized by nitration. To accomplish this, 850 parts by weight of MP-32 solids were placed in water along with 25 parts by weight of sodium nitrite. The mixture was refluxed for 5 hours at 200-212° F. and then dried to constant weight at 230° F. During the oxidation, the MP-32 solids increased approximately 3% in weight. Comparative tests of the oxidized (nitrated) product (thinner) (3 lb./bbl. of thinner), the original sulfo-methylated lignite and quebracho-caustic (10-5) in a lime mud showed that the yield point of the muds containing the nitrated product was only ¼ of the yield point of the muds containing sulfo-methylated lignite or the quebracho-caustic product. A comparison of the nitrated product and MP-69 (air-oxidized sulfo-methylated lignite) at a level of 5 lb./bbl. in the lime base mud indicated the yields of the mud were approximately the same and in each case were 6 or less.

EXAMPLE XIII

To demonstrate that hydrogen peroxide could be used as the oxidizing agent, 1000 parts of sulfo-methylated lignite (MP-32) solution (30% MP-32 solids) were oxidized with 120 parts of 30% hydrogen peroxide added over a period of 1.5 hours. In one test, 23 parts of ammonium meta-vanadate (plus 8 parts of additional NaOH) was used as a catalyst and in the other 50 parts of cobalt acetate tetra-hydrate (plus 16 grams additional NaOH) was used as a catalyst. In each case, the reaction was conducted at about 175° F. and at atmospheric pressure. During the oxidation, the pH of the mixture dropped approximately 1 unit and there was a noticeable decrease in viscosity and a typical gain in weight of the MP-32.

Tests of the oxidized products in water base muds as above defined reduced the yield point (at 2 lb./bbl. of the oxidized product) to about 30% of that of the untreated mud.

EXAMPLE XIV

As pointed out above, the sulfo-alkylated lignites of this invention can have their efficiency increased by using chlorine (or equivalent) as the oxidizing agent. To demonstrate this, a solution of sulfomethylated lignite (MP-32) was vigorously agitated while a moderate stream of chlorine gas was passed thereinto. As the chlorination proceeded, the temperature of the charge rose about 20° F. within one hour, while the pH dropped from an original 10.6 to 7.0. The chlorination was interrupted after one hour. The rapid drop in pH and rise in temperature indicated a vigorous oxidation of the sulfo-methylated lignite by the chlorine. At this point it should be pointed out that since the oxidation was conducted in an alkaline medium, the chlorine probably was converted to sodium hypochlorite and this was actually the oxidizing agent. However, whether sodium hypochlorite, chlorine gas or other halide yielding materials are used, the over all process can be called oxidation.

Tests of the chlorinated product in a lime base mud (6 lb./bbl. lime), using 4 lb./bbl. of the product with 2.5 lb./bbl. of caustic, reduced the yield point of the mud to 7 from a value which would have been too thick to measure without the thinner. It should be noted that since final pH of the chlorinated product is somewhat lower than that for the air-oxidized product (MP-69), it may be advisable to use additional amounts of caustic in the mud to compensate for this.

All "parts" referred to herein are parts by weight unless otherwise specifically noted. All test procedures used in conjunction with evaluating the various dispersants in drilling muds were conducted according to A.P.I. Code 29 and yields are reported in pounds per 100 square feet.

As indicated above, the dispersing agents of this invention are useful not only in simple water-base muds, but more particularly in muds contaminated with calcium and sodium compounds which tend to increase the viscosity of the mud. The amounts of these compounds required to cause an increase in viscosity in the absence of the viscosity reducing agents of this invention will vary with the mud composition and type and the conditions of its use. Accordingly, no hard and fast rule can be laid down as to the amounts of these contaminants which will cause a substantial increase in yield and, as is usual in the mud treatment, such mud will have to have its individual tolerance to these compounds determined before any reliable conclusion can be drawn as the yield point increasing amounts of these contaminants. Ordinarily, at least 0.5 lb./bbl. of these contaminants will be required to tend to cause a substantial increase in yield. It should further be pointed out that the thinning agents of this invention are especially useful in lime base muds where lime is deliberately added along with caustic in a manner well-known to those skilled in the art.

The exact amounts of the thinners which are to be added to a particular mud to reduce its yield to a desired value can only be determined in the field by routine tests. As is known, these tests are conducted on mud before it is thinned even when well-known thinners such as caustic-quebracho are being used. However, for the sake of completeness, it is stated that the dispersing agents of this invention can be used in amounts within the range of 0.5 to 15, preferably 1 to 10, lb./bbl. to achieve various degrees of thinning in different muds.

Usually the pH of the mud to be treated will be above 7.

From the foregoing it will be seen that this invention is one well adapted to attain all of the ends and objects hereinabove set forth, together with other advantages which are obvious and which are inherent to the composition and method.

The invention having been described, what is claimed is:

1. The process of preparing a sulfo-alkylated lignite which comprises reacting lignite in an alkaline reaction medium with from 6 to 50 parts of a sulfur compound selected from the group consisting of sulfurous acid and its water-soluble salts, and a methylenic compound selected from the group consisting of aldehydes and methyl ketones in an amount stoichiometrically equivalent to an amount of formaldehyde in the range of 3 to 25 parts of formaldehyde per 100 parts of said lignite, the reaction being conducted at an elevated temperature under 375° F.

2. The process of preparing a sulfo-alkylated lignite which comprises mixing lignite in a fluid reaction medium with 10 to 100 parts of an alkali metal hydroxide per 100 parts of said lignite, with 6 to 50 parts of an alkali metal sulfite per 100 parts of said lignite and with a methylenic compound selected from the group consisting of aldehydes and methyl ketones in an amount stoichiometrically equivalent to an amount of formaldehyde in the range of 3 to 25 parts per 100 parts of said lignite, maintaining the reaction mixture at an elevated temperature below 375° F. for a period of time sufficient to cause said lignite to be converted to a more hydrophyllic form and then drying the resulting lignitic reaction product.

3. The process of claim 2 wherein said methylenic compound is formaldehyde.

4. The process for increasing the hydrophyllic properties of lignite which comprises reacting lignite in an alkaline reaction medium with a sulfur compound selected from the group consisting of sulfurous acid and its water-soluble salts, and a methylenic compound selected from the group consisting of aldehydes and methyl ketones to form a sulfo-alkylated lignite, and oxidizing the sulfo-alkylated lignite in a fluid reaction medium with an oxidizing agent having effective oxidation potential in the fluid medium at a pH not less than 7.0 at a temperature in the range of 40 to 375° F. and for a period of time sufficient to increase the weight of the sulfo-alkylated lignite by at least three percent, the time and temperature being selected to be such that the dispersing power and the tolerance toward calcium ions in aqueous solution of the sulfo-alkylated lignite is increased.

5. A dry free-flowing water soluble lignite derivative made by heating 100 parts of lignite in a liquid reaction mixture with from 6 to 50 parts of alkali metal sulfite, 3 to 25 parts of formaldehyde, and 10 to 100 parts of alkali metal hydroxide at a temperature in the range from 175° to 375° F. for a time sufficient for a substantial portion of the sulfite and formaldehyde to react and form side chains on the lignite having the formula —R—SO₃M, wherein —R— is a methylene group and M is an alkali metal; and drying the resulting product.

6. A water soluble lignite derivative made by heating 100 parts of lignite in an alkaline liquid reaction medium with 6 to 50 parts of a sulfur compound selected from the group consisting of sulfurous acid and its water soluble salts, and a methylenic compound selected from the group consisting of aldehydes and methyl ketones, said methylnic compound being present in amount stoichiometrically equivalent to an amount of formaldehyde within the range from 3 to 25 parts of formaldehyde per 100 parts of lignite, at a temperature in the range from 175° to 375° F. for a time sufficient for a substantial proportion of the methylenic and the sulfur compounds to react and form side chains on the lignite having the formula —R—SO₃M, wherein —R— is selected from the group consisting of methylene and substituted methylene radicals and M is an alkali metal; and drying the resulting product.

7. The derivative of claim 6 wherein said methylenic compound is formaldehyde.

8. The derivative of claim 6 wherein the methylenic compound is furfuryl.

9. The derivative of claim 6 wherein said methylenic compound is acetone.

10. A water soluble lignite derivative made by heating an alkaline liquid reaction mixture containing 100 parts of lignite, 6 to 50 parts of a sulfur compound selected from the group consisting of sulfurous acid and its water soluble salts, and a methylenic compound selected from the group consisting of aldehydes and methyl ketones, said methylenic compound being present in amount stoichiometrically equivalent to an amount of formaldehyde within the range from 3 to 25 parts of formaldehyde per 100 parts of lignite, at a temperature in the range from 175° to 375° F. for a time sufficient for a substantial proportion of the methylenic compound and sulfur compound to react with each other and with the lignite; oxidizing the resulting product sufficiently to increase the yield point reducing power thereof; and drying the product.

11. The process of preparing a sulfo-alkylated lignite which comprises reacting lignite in an alkaline reaction medium with from 6 to 50 parts of an alkali metal sulfite and from 3 to 25 parts of formaldehyde per 100 parts of said lignite, the reaction being conducted at an elevated temperature under 375° F.

12. The process of preparing a sulfo-alkylated lignite which comprises reacting lignite in an alkaline reaction medium with from 6 to 50 parts of an alkali metal sulfite, and furfural in an amount stoichiometrically equivalent to an amount of formaldehyde in the range of 3 to 25 parts of formaldehyde per 100 parts of said lignite, the reaction being conducted at an elevated temperature under 375° F.

13. The process of preparing a sulfo-alkylated lignite which comprises reacting lignite in an alkaline reaction medium with from 6 to 50 parts of an alkali metal sulfite and acetone in an amount stoichiometrically equivalent to an amount of formaldehyde in the range of 3 to 25 parts of formaldehyde per 100 parts of said lignite, the reaction being conducted at an elevated temperature under 375° F.

14. A process for increasing the hydrophyllic properties of lignite which comprises reacting lignite in an alkaline reaction medium with a sulfur compound selected from the group consisting of sulfurous acid and its water-soluble salts, and a methylenic compound selected from the group consisting of aldehydes and methyl ketones to form a sulfo-alkylated lignite, and oxidizing the sulfo-alkylated lignite with air in a fluid reaction medium in the presence of an oxidation catalyst comprising an oxygen-containing compound of a polyvalent metallic element having more than one valence toward oxygen, at a temperature in the range of 40° to 375° F. and for a period of time sufficient to increase the weight of the sulfo-alkylated lignite by at least three percent, the time and temperature being selected to be such that the dispersing power and the tolerance toward calcium ions in aqueous solution of the sulfo-alkylated lignite is increased.

15. A process for increasing the hydrophyllic properties of lignite which comprises reacting lignite in an alkaline reaction medium with an alkali metal sulfite and formaldehyde, and oxidizing the resulting sulfo-alkylated lignite with air in a fluid reaction medium in the presence of an oxidation catalyst comprising an oxygen-containing compound of a polyvalent metallic element having more than one valence toward oxygen, at a temperature in the range of 40° to 375° F. and for a period of time sufficient to increase the weight of the sulfo-alkylated lignite by at least three percent, the time and temperature being selected to be such that the dispersing power and the tolerance toward calcium ions in aqueous solution of the sulfo-alkylated lignite is increased.

16. A process for increasing the hydrophyllic properties of lignite which comprises reacting lignite in an alkaline reaction medium with an alkali metal sulfite and furfural, and oxidizing the sulfo-alkylated lignite with air in a fluid reaction medium in the presence of an oxidation catalyst comprising an oxygen-containing compound of a polyvalent metallic element having more than one valence toward oxygen, at a temperature in the range of 40° to 375° F. and for a period of time sufficient to increase the weight of the sulfo-alkylated lignite by at least three percent, the time and temperature being selected to be such that the dispersing power and the tolerance toward calcium ions in aqueous solution of the sulfo-alkylated lignite is increased.

17. A process for increasing the hydrophyllic properties of lignite which comprises reacting lignite in an alkaline reaction medium with an alkali metal sulfite and acetone, and oxidizing the sulfo-alkylated lignite with air in a fluid reaction medium in the presence of an oxidation catalyst comprising an oxygen-containing compound of a polyvalent metallic element having more than one valence toward oxygen, at a temperature in the range of 40° to 375° F. and for a period of time sufficient to increase the weight of the sulfo-alkylated lignite by at least three percent, the time and temperature being selected to be such that the dispersing power and the tolerance toward calcium ions in aqueous solution of the sulfo-alkylated lignite is increased.

18. A process for increasing the hydrophyllic properties of lignite which comprises reacting lignite in an alkaline reaction medium with a sulfur compound selected from the group consisting of sulfurous acid and its water-soluble salts, and a methylenic compound selected from the group consisting of aldehydes and methyl ketones to form a sulfo-alkylated lignite, and oxidizing the sulfo-alkylated lignite with chlorine in a fluid reaction medium at a temperature in the range of 40° to 375° F. and for a period of time sufficient to increase the weight of the sulfo-alkylated lignite by at least three percent, the time and temperature being selected to be such that the dispersing power and the tolerance toward calcium ions in aqueous solution of the sulfo-alkylated lignite is increased.

19. A process for increasing the hydrophyllic properties of lignite which comprises reacting lignite in an alkaline reaction medium with a sulfur compound selected from the group consisting of sulfurous acid and its water-soluble salts, and a methylenic compound selected from the group consisting of aldehydes and methyl ketones to form a sulfo-alkylated lignite, oxidizing the sulfo-alkylated lignite with a water-soluble nitrite in a fluid reaction medium, at a temperature in the range of 40° to 375° F. and for a period of time sufficient to increase the weight of the sulfo-alkylated lignite by at least three percent, the time and temperature being selected to be such that the dispersing power and the tolerance toward calcium ions in aqueous solution of the sulfo-alkylated lignite is increased.

20. A water-soluble lignite derivative made by heating an alkaline liquid reaction mixture containing 100 parts of lignite, 6 to 50 parts of a sulfur compound selected from the group consisting of sulfurous acid and its water-soluble salts, and formaldehyde within the range from 3 to 25 parts of formaldehyde per 100 parts of lignite, at a temperature in the range from 175° to 375° F. for a time sufficient for a substantial proportion of formaldehyde and sulfur compound to react with each other and with the lignite; oxidizing the resulting product sufficiently to increase the yield point reducing power thereof; and drying the product.

21. A water-soluble lignite derivative made by heating an alkaline liquid reaction mixture containing 100 parts of lignite, 6 to 50 parts of a sulfur compound selected from the group consisting of sulfurous acid and its water-soluble salts, and furfural in amount stoichiometrically equivalent to an amount of formaldehyde within the range from 3 to 25 parts of formaldehyde per 100 parts of lignite, at a temperature in the range from 175° to 375° F. for a time sufficient for a substantial proportion of the furfural and sulfur compound to react with each other and with the lignite; oxidizing the resulting product sufficiently to increase the yield point reducing power thereof; and drying the product.

22. A water-soluble lignite derivative made by heating an alkaline liquid reaction mixture containing 100 parts of lignite, 6 to 50 parts of a sulfur compound selected from the group consisting of sulfurous acid and its water-soluble salts, and acetone in amount stoichiometrically equivalent to an amount of formaldehyde within the range from 3 to 25 parts of formaldehyde per 100 parts of lignite, at a temperature in the range from 175° to 375° F. for a time sufficient for a substantial proportion of acetone and sulfur compound to react with each other and with the lignite; oxidizing the resulting product sufficiently to increase the yield point reducing power thereof; and drying the product.

No references cited.